Sept. 24, 1957   W. M. HAWKINS, JR., ET AL   2,807,429
APPARATUS FOR FACILITATING THE TAKING OFF
AND LANDING OF VERTICAL RISING AIRCRAFT
Filed Nov. 30, 1953   6 Sheets-Sheet 1
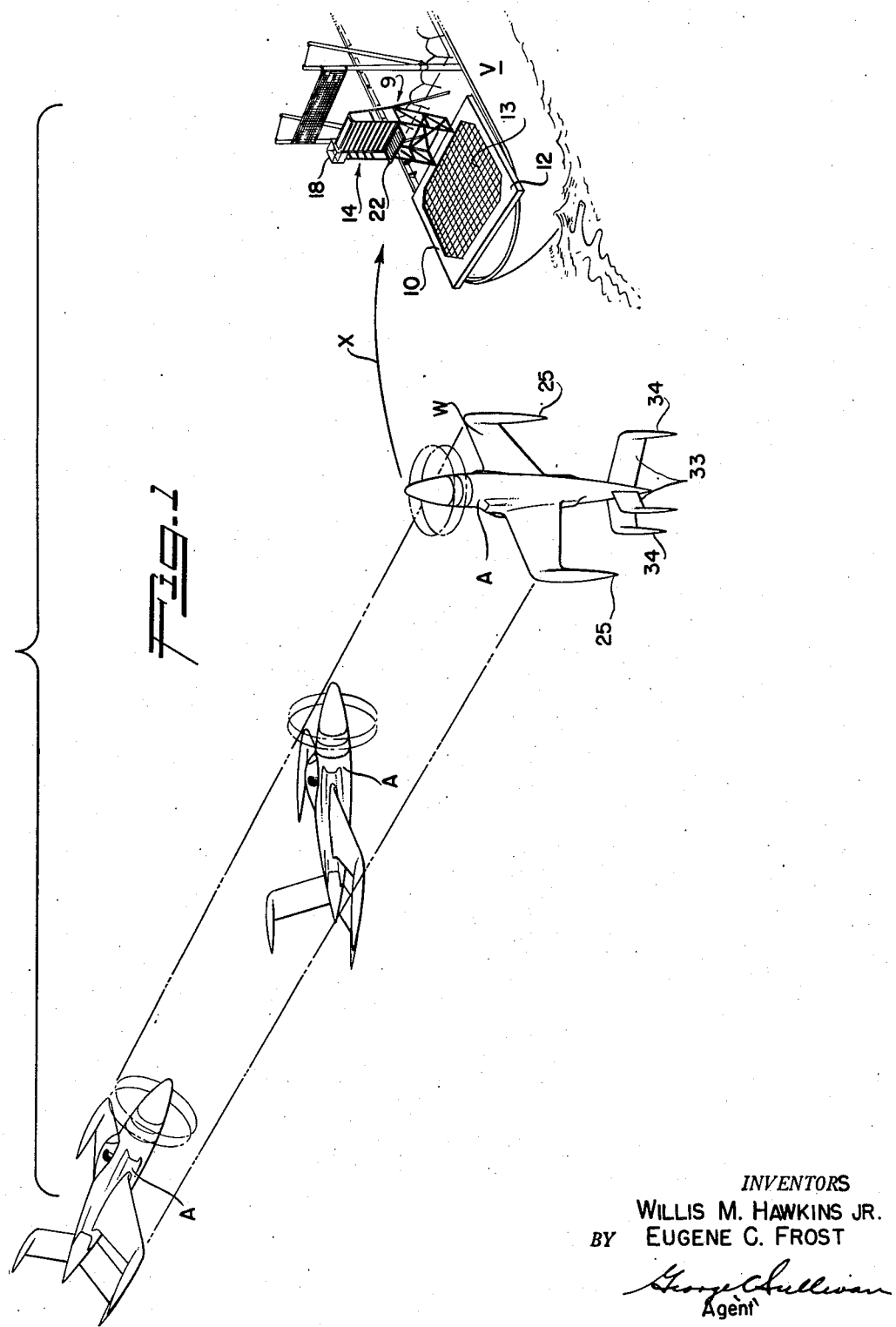
INVENTORS
WILLIS M. HAWKINS JR.
BY   EUGENE C. FROST
George Sullivan
Agent

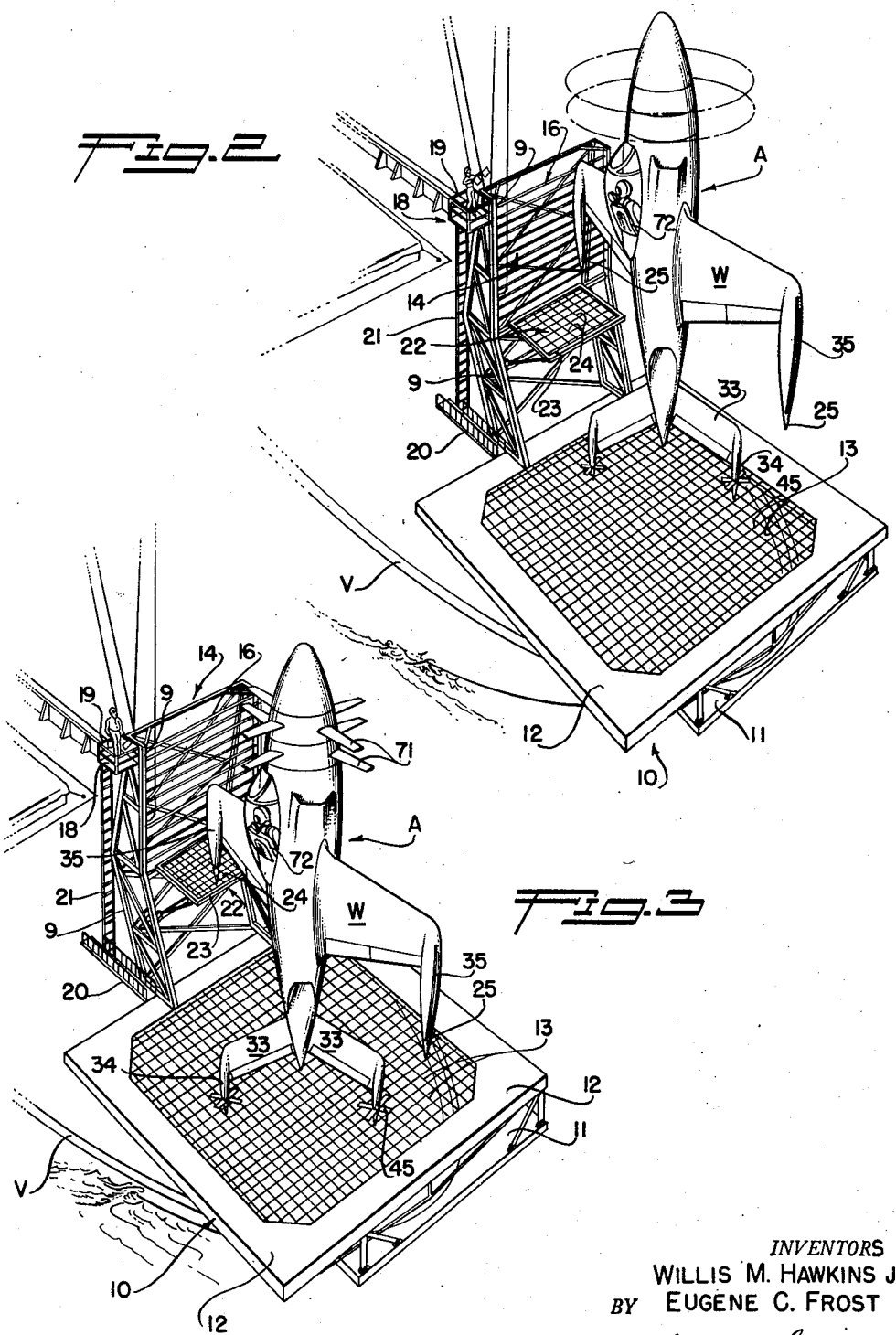

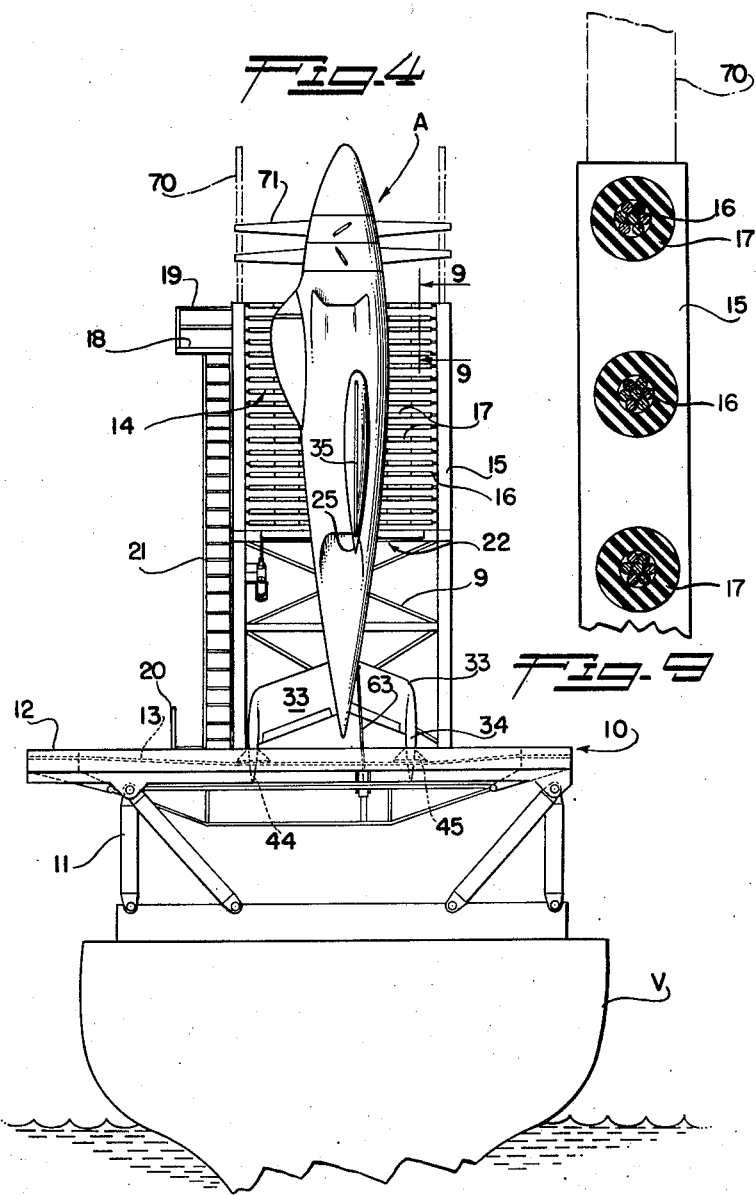

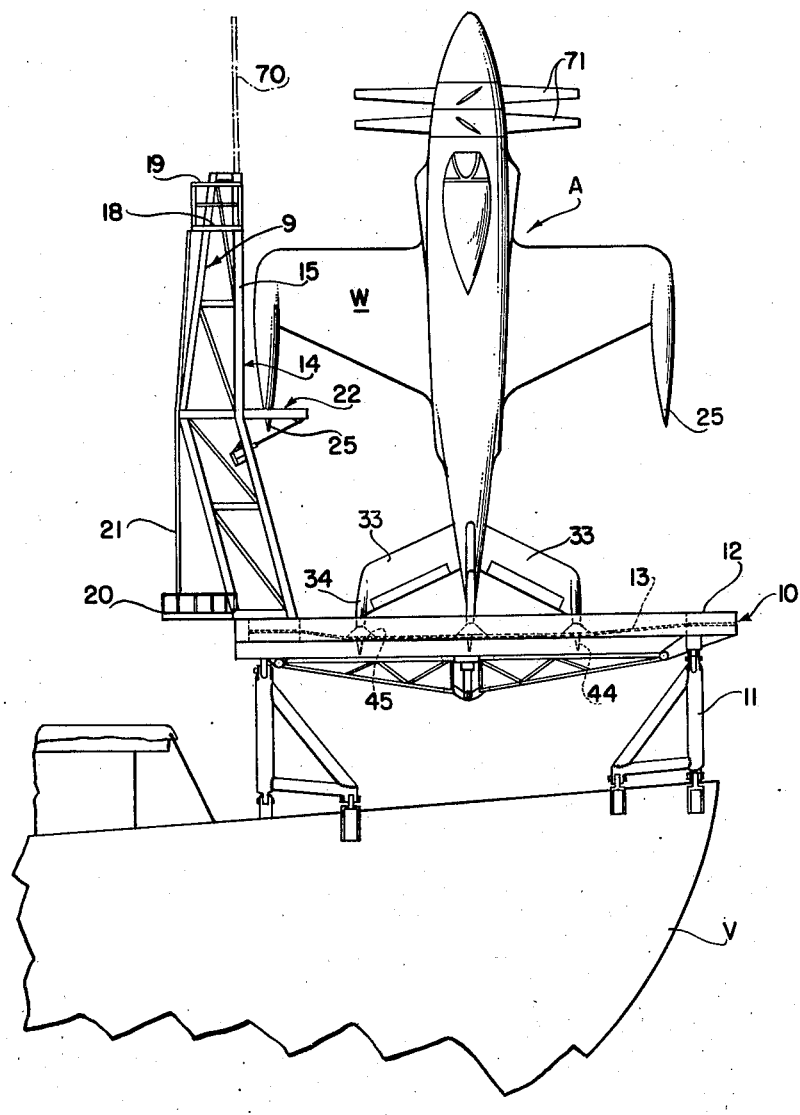

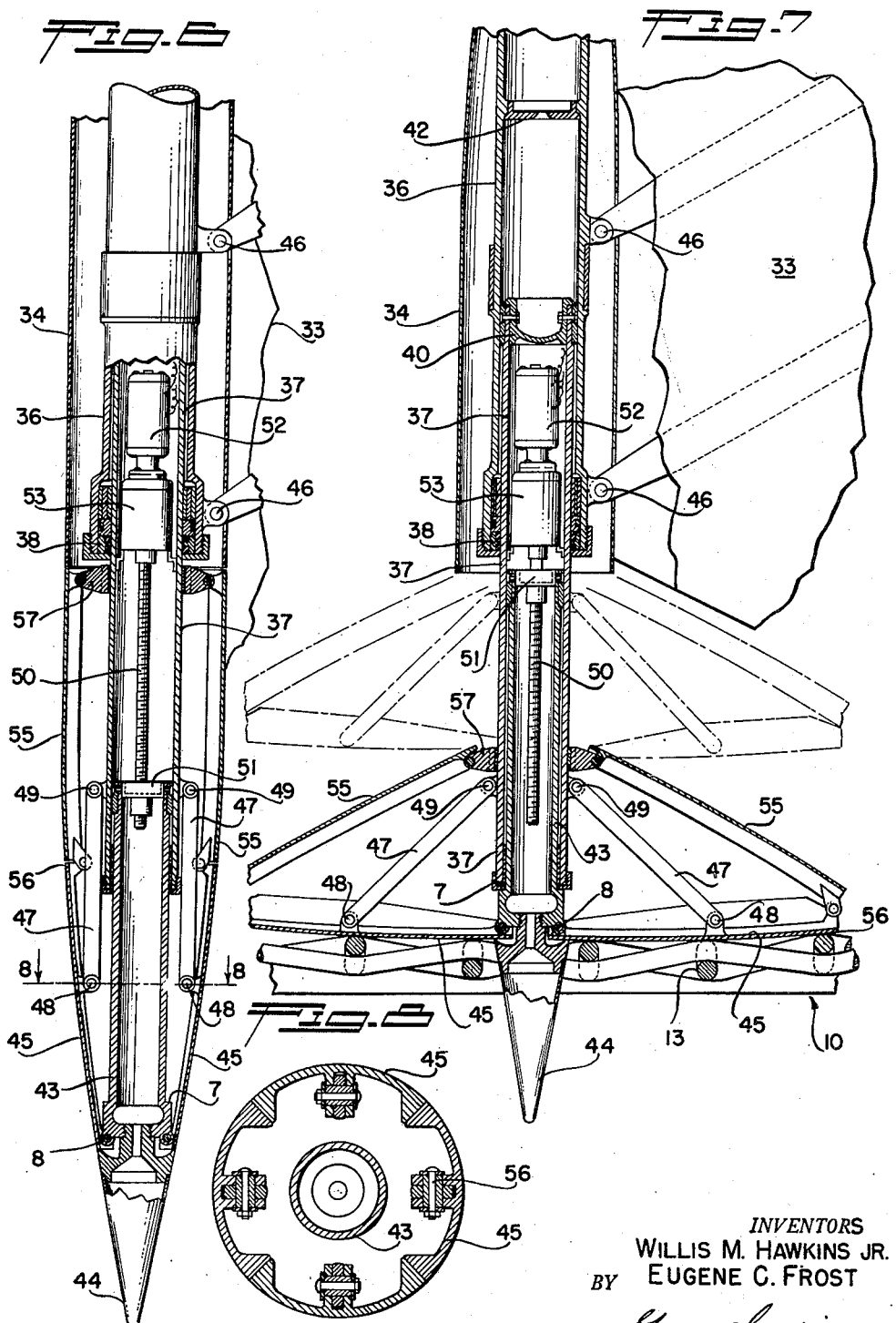

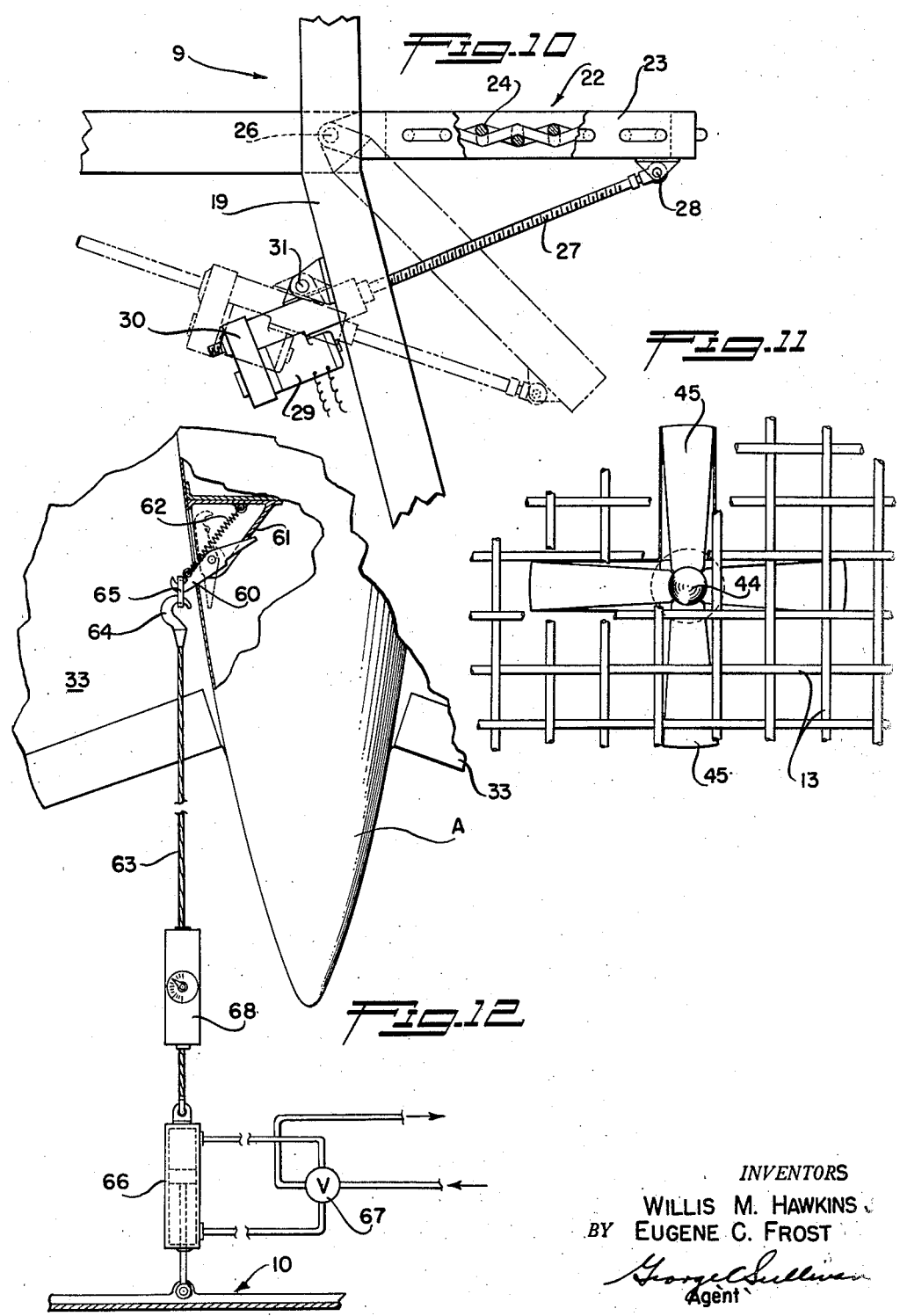

United States Patent Office 2,807,429
Patented Sept. 24, 1957

2,807,429

APPARATUS FOR FACILITATING THE TAKING OFF AND LANDING OF VERTICAL RISING AIRCRAFT

Willis M. Hawkins, Jr., North Hollywood, and Eugene C. Frost, Burbank, Calif., assignors to Lockheed Aircraft Corporation, Burbank, Calif.

Application November 30, 1953, Serial No. 395,108

13 Claims. (Cl. 244—114)

This invention has to do with the taking off and landing of aircraft and has more particular reference to landing and taking off apparatus or equipment for facilitating the landing and taking off of vertical rising aircraft.

Where aircraft such as fighters, interceptors, search airplanes, convoy fighters, liaison and rescue airplanes, and the like, are designed and intended to operate from small landing and take off areas, a practical and highly satisfactory procedure is to have the airplane take off vertically and land in the vertical attitude. For example, convoy fighters for protecting ocean going vessels such as freighters and tankers, do not have extensive landing and take off areas on the vessels and the vertical ascent and landing in the vertical attitude constitutes a solution to the problem of operating airplanes from such vessels. Also, in the case of land based airplanes operating in regions where there are no prepared or available landing fields, the vertical take off and landing in the vertical attitude make the operation of fighters, interceptors, search planes, rescue planes, and the like, entirely practical and feasible. Furthermore, such procedures make it unnecessary to provide or prepare landing decks, extensive fields, and the appurtenant equipment with a consequent material saving in cost and in the case of military operations greatly expediting the entire program.

It is, therefore, a general object of the present invention to provide simple, practical, compact and relatively inexpensive facilities for taking off airplanes, of the propeller and/or reaction jet type, vertically and for landing the same in the vertical attitude.

It is another object of the invention to provide apparatus of this kind wherein the airplane is supported and restrained in a vertical position preparatory to taking off and its propulsive engine or engines are operated to obtain substantial or full thrust whereupon the airplane is released from its supporting or landing equipment to rise vertically, or substantially vertically, therefrom. Thus with the apparatus of the invention no horizontal take off run is required and consequently the take off area may be quite small, its size being determined primarily by the dimensions of the airplane itself. Furthermore, no catapulting equipment, or the like, is required to assist in imparting horizontal velocity to the airplane for the take off.

Another object of the invention is to provide equipment of the class described which permits the position or attitude of the airplane preparatory to landing to be changed from a generally horizontal normal flight attitude to a substantially vertical attitude, then translated horizontally and downwardly in this vertical attitude toward the landing area to a position adjacent the same, then translated sidewise over the landing area and finally dropped or moved downwardly by reducing the thrust of the propulsive engine or engines.

It is another object of the invention to provide a landing apparatus of the type just mentioned wherein the aircraft is positioned relative to the landing area by engaging one of its wing tips with a back stop, or by bringing the wing tip close to the back stop, prior to the final downward movement and is then adequately anchored at its wing tip and empennage by parts thereon penetrating nets so as to be dependably stabilized against the effects of wind, and in the case of landing on shipboard, stabilized and restrained against the effects of pitching, plunging, and rolling of the vessel.

Another object of the invention is to provide facilities or equipment for the vertical take off of aircraft and for the landing of the vertical rising type of aircraft, which equipment is readily installed on the decks of freighters, tankers, and like vessels, as well as on land areas of small size, irregular terrain, etc. The equipment or apparatus may be designed to be readily transported and assembled and to occupy a minimum of space aboard ship or on other mobile vehicles, or at stationary land based stations. In addition to being adapted for use on water borne craft, the apparatus may readily be adapted for installation on the roofs of buildings, on the ground, and in other land installations, being such that it may be easily and quickly installed for immediate use and later dismantled and transported for use elsewhere.

It is another object of the invention to provide apparatus of the class described characterized by a main landing net adapted to be engaged by pads or tail stands on the empennage portions of the airplane to support and anchor the airplane and by a tip-net to receive and anchor a "point" on the wing tip of the airplane. With the vertically disposed airplane thus supported and anchored at a plurality of points at its aft end or empennage and at its wing tip, it is dependably held against displacement, tipping, or falling, even under severe conditions of pitch and/or roll of the supporting vessel and/or substantial winds.

A further object of the invention is to provide apparatus of the character mentioned having a back stop or vertically arranged assembly of rollers adjacent the tip-net to be used as a visible reference by the pilot and/or to be engaged by the tip of the airplane wing to locate the airplane above the main landing net which back stop may carry posts, markers, or the like, to be visibly observed by the pilot to assist him in landing the craft and may carry or be associated with a platform or station for a landing signal officer who may direct the pilot during the final phases of the landing operations.

A still further object of the invention is to provide landing and take off equipment of this class including novel shock absorbing alighting gear provided on the empennage of the airplane and embodying spikes or pointed parts for penetrating the main landing net and laterally extensible pads for bearing on the net to support the airplane, the points and pads being carried by pneumatic-hydraulic shock absorbing cylinders which assist in absorbing the shocks accompanying the vertical landing of the airplane. While this apparatus effectively anchors the airplane against wind loads and pitching and rolling of the supporting vessel, it does not interfere in any way with the free unimpeded subsequent vertical rising or taking off of the airplane.

Other objectives and features will become apparent from the following detailed description of a typical preferred embodiment of the apparatus, throughout which description reference will be made to the accompanying drawings wherein:

Figure 1 is a more or less diagrammatic view illustrating a vertical rising type airplane in several attitudes during its approach to the landing equipment;

Figure 2 is an enlarged perspective view showing the airplane in a vertical attitude above the landing net before landing;

Figure 3 is a view similar to Figure 2 illustrating the airplane landed on the nets;

Figure 4 is an enlarged view of the landing equipment and aircraft as viewed from the aft end of the supporting vessel;

Figure 5 is an enlarged side elevation of the equipment with the aircraft supported thereon;

Figure 6 is an enlarged vertical fragmentary sectional view of one unit of the alighting gear showing the extensible feet or pads in the retracted positions;

Figure 7 is a view similar to Figure 6 showing the feet or pads in the extended positions with the broken lines indicating the positions of the feet that may be assumed during the landing of the airplane;

Figure 8 is an enlarged transverse sectional view taken as indicated by line 8—8 on Figure 6;

Figure 9 is a fragmentary vertical sectional view taken as indicated by line 9—9 on Figure 4;

Figure 10 is an enlarged fragmentary edge or side elevation of a portion of the equipment illustrating the tip net and the mechanism for retracting the same with broken lines showing the tip net in a partially retracted position;

Figure 11 is a fragmentary view of one of the alighting gear units as viewed from beneath the main net with portions of the net broken away to illustrate two of the feet or legs in elevation; and Figure 12 is an enlarged partially diagrammatic view illustrating the hold-down mechanism of the landing and take off equipment.

The equipment or apparatus of the invention may, of course, be varied or modified considerably to suit it for installations of different kinds and to adapt it for the handling of aircraft of various types. In the drawings there is shown one embodiment of the invention installed on a freighter and the invention will be described in connection with this apparatus, it being understood that this is simply one manner of carrying out the invention. The landing and taking off equipment includes a platform 10 supported on or above the deck of the vessel V. In the case illustrated, the platform 10 is supported above the after deck of the vessel V by a suitable supporting structure 11. The platform 10 may be square or rectangular in plan elevation and has a rather wide margin or apron 12 which may be used as a deck or walk-way for the personnel. A net 13 extends across the area defined by the frame-like apron 12 to receive the airplane A when the same is landed and to thereafter support the airplane until it subsequently takes off. The net 13 is preferably composed of individual steel cables woven to form a net or screen and pre-loaded under appropriate tension. In practice, the cables of the net 13 may be spaced on six inch centers. As illustrated, the landing platform 10 is substantially horizontal, assuming the vessel V to be in a normal attitude, and may protrude from one side, say the port side of the vessel, while its opposite edge may be inboard from the starboard side of the vessel.

The apparatus of the invention further includes a generally vertical structure adjacent the landing platform 10, which we will term a back stop 14. The back stop 14 is engageable by a wing tip of the airplane A during the landing procedure, as will be later described, to assist in locating the airplane preparatory to finally landing on the net 13, may assist in stabilizing the airplane as it is being landed, and constitutes a reference element which the pilot of the airplane may observe and view as he lands the airplane. The back stop 14 is shown carried by an appropriate framework or structure 9 rising from the forward edge of the platform 10, it being understood that the back stop 14 may be directly carried by the vessel V or other available supporting part. In the particular case illustrated, the back stop 14 includes a vertically disposed rectangular frame 15 and vertically spaced generally horizontal cables 16 are secured to and extend between the two vertical sides of the frame. The cables 16 are covered by thick walled tubes 17 of rubber, rubber composition, or the like, which is suitably yielding and resilient. This construction is illustrated in detail in Figure 9. The yielding sleeves or tubes 17 are free to rotate on their respective cables 16 to form yieldnig rollers for contact by the wing tip of the airplane A. The cables 16 are appropriately tensioned and the tubes or sleeves 17 are relatively short to be free for independent turning or rotation on their respective cables. The vertical spacing of the rollers or sleeves 17, one from the other, is also rather close so that there is no possibility of the wing tip portion of the airplane entering between two adjacent sleeves. In the drawings it will be observed that the back stop 14, just described, is spaced some distance above the landing net 13 so as to be engageable by the wing tip of the airplane A when the latter is still airborne above the net 13 prior to landing. The back stop 14 preferably has a considerable vertical height to permit initial contact of the wing tip with the back stop while the airplane is some distance above the landing net. The cables 16 as well as their tubes 17 provide resiliency and shock absorbing ability for the back stop 14.

It is preferred to provide a station 18 for a landing signal officer or other person or persons to direct and signal the pilot during the landing of the airplane. This station 18 is preferably at or adjacent the back stop 14 and, as illustrated in the drawings, may be in the form of a platform provided with safety rails 19 and located at the upper port corner of the back stop frame 15. The landing signal officer's station 18 may be reached by a catwalk 20 and ladder 21 leading from the apron 12 of the landing platform.

A wing tip net 22 is provided at or adjacent the lower edge of the back stop 14 to receive and anchor a wing tip part when the airplane A is finally landed. A tip net 22 projects horizontally in the aft direction from adjacent the lower edge of the back stop 14 and includes a rectangular frame 23 carrying rope 24. The rope 24 is woven to constitute a net being preferably nylon rope, or the equivalent, tied or secured on approximately ten inch centers. The airplane A, as illustrated, has wing tip pods, tanks, or nacelles, projecting from the trailing edges of the wings W and provided with rearwardly directed points 25. The tip point 25 of one wing W is adapted to penetrate or enter the net 24 as illustrated in Figures 3 and 5 to assist in anchoring the wing of the airplane to the landing equipment and to stabilize the landed aircraft.

The tip net 22 is preferably retractible to leave the area above the landing net 13 entirely clear and unobstructed for the take off operations. The frame 23 of the tip net may be hinged to the framework 9 at 26 so that the net may be swung downwardly into or against the framework. Means is provided for moving the tip net 22 between the extended operative position and the retracted position. This means may be in the form of a screw-jack arrangement comprising a screw 27 hinged to the outer portion of the tip net frame 23 at 28 as shown in Figure 10. An electric motor 29 drives a nut 30 to advance and retract the screw 27, the nut and motor assembly being hinged to the framework 9 at 31. Figure 10 of the drawings illustrates the manner in which the wing tip net 22 may be moved between its extended and operative generally horizontal position and its retracted position, the broken lines illustrating a partially retracted position of the net.

The airplane A may have provisions for cooperating with the back-stop 14 and tip net 22. For example, the tip rod of the wing W may have a rub-strip of hardwood, Titanium, or the like, positioned on the outer side of the pod to engage or ride on the rollers or sleeves 17 of the backstop. The pointed tail 25 of the wing tip pod may have rub-strips 35 of similar material to prevent the tip net cables or ropes 24 from rubbing or injuring the pod.

The invention further includes alighting means or landing gear on the airplane A for cooperating with the landing net 31. While, as above pointed out, the invention is adapted to facilitate the landing and taking off of aircraft of different types, etc., it is desirable to equip the airplane with alighting gear especially designed to cooperate with the net 13 of the landing platform 10. The airplane A illustrated in the drawings, has an empennage comprised of three equally spaced elements or surfaces 33 and each of these parts or surfaces is provided at its tip with a streamlined pod 34. The pods 34 project rearwardly beyond the trailing edges of the surfaces 33 which, of themselves, may be swept back and the alighting gear, just mentioned, is carried in or by these pods.

The shock absorbing alighting gear on the empennage surfaces 33 may be identical and we will proceed with a detailed description of one of them, it being understood that such description is equally applicable to the other gear. Each alighting gear includes a cylinder 36 arranged longitudinally in the pod 34 to be substantially vertical when the airplane is in the vertical attitude. The cylinder 36 is secured to the structure of the tail member or surface at 46, as shown in Figures 6 and 7. A hollow or tubular plunger or piston tube 37 slidably passes through packing means 38 in the lower end of the cylinder and the piston tube has a closed head 40 on its upper end for slidably operating the cylinder. The cylinder 36 above the piston head 40 contains air or air and liquid and an orifice plate 42 is provided in the upper portion of the cylinder to control the displacement of the fluid from above the piston and thus provide the desired movement damping or shock absorbing action. The piston tube 37 is of sufficient length to project a substantial distance from the lower end of the cylinder 36. The projecting lower portion of the piston tube 37 carries the net engaging and airplane supporting means of the alighting gear.

This means includes a tube 43 slidable within the piston tube 37 and extensible from the lower end thereof. A point 44 is secured to the lower end of the tube 43 and is shaped and proportioned to penetrate or enter the landing net 13, as illustrated in Figure 7. A plurality of circumferentially spaced pads or fingers 45 is provided on the lower end of the tube 43, the fingers being pivoted on the tube 43 at 8 immediately above the point 44. The fingers 45 are constructed and arranged to move between retracted positions where they lie generally axially of the tube 37 and extended operative positions where they project substantially radially from the tube 43. Links 47 are hinged to the inner sides of the fingers 45 at 48 and the upper ends of the links are pivoted to the piston tube 37 at 49. Means is provided for moving the tube 43 inwardly or upwardly to cause lateral extension of the fingers 45 from the tube assembly. This means may take the form of a rotatable screw 50 threaded through a nut 51 fixed in the upper end of the tube 43. The screw 50 is driven or rotated by a reversible electric motor 52 driving through a speed reduction gear 53. It will be seen that upon upward movement of the tube 43 by operation of the screw 50 the pads or fingers 45 are pivoted laterally or radially outward and downwardly to positions such as shown in the full lines in Figure 7. The tube 43 has a shoulder 7 for engaging the lower end of the piston tube 37 for limiting the upward travel of the tube 43 and for transmitting the landing loads directly to the piston tube 37.

It may be preferred to fair in the space between the streamlined point 44 and the lower or rear end of the streamlined pod 34 to reduce aerodynamic drag during flight of the airplane A. The fingers 45 and pivoted sections or extensions 55 thereof may be employed for this purpose. As shown in Figure 8, the fingers 45 are segmental in transverse cross section so that the fingers when in the folded or raised positions have their edges in engagement to define a tubular frusto-conical assembly. The extensions 55 are also segmental in transverse cross section and have their lower ends hinged or pivoted to the fingers 45 at 56. The upper ends of the extensions 55 are pivoted to a sleeve 57 which, in turn, slides on the piston tube 37. The extensions 55 are designed and proportioned to close the space between the lower edge of the hollow pod 34 and the upper edges of the fingers 45 when the latter are in their normal retracted positions. It will be observed in Figure 6 that the fingers 45 and their extensions 55 constitute a streamlined or tapered hollow assembly effectively fairing in the area between the end of the pod 34 and the point 44.

Preparatory to landing the airplane the motors 52 of the several alighting gear are energized to move the tubes 43 upwardly or in the forward direction from the position indicated in Figure 6 to positions such as indicated in Figure 7. This produces lateral projection of the fingers 45 to the extended or operated full line positions of Figure 7. When the airplane is landed on the net 13, as will be later described, the points 44 of the several alighting assemblies enter or penetrate the net 13 and the pads or fingers 45 strike or engage the net to support the airplane A thereon. The piston tubes 37 and cylinders 36 cooperate or have relative sliding movement retarded by the flow of fluid through the respective orifice plates 42 to absorb the shock that may accompany landing of the airplane. The broken lines of Figure 7 illustrate relative positions of the pads or fingers 45 and associated parts which these parts may assume when the piston tubes 37 are at the upper or extreme ends of their movement.

The invention includes a hold down means for anchoring the airplane A at the platform 10 to permit the running up and testing or checking out of the engine or engines of the airplane and to permit the airplane to take off vertically when substantial or maximum thrust has been developed by its propulsive mechanism. This hold down means includes a hook 60 pivoted in a bracket 61 secured in the aft portion of the airplane A. The hook 60 is pivoted and arranged to be manually moved from the broken line position of Figure 12 to the full line position where it projects from the airplane. A spring 62 is connected with the hook 60 to normally hold it in the retracted position where it does not create aerodynamic drag. The hold down means further includes a cable 63 provided at its outer or upper end with a hook 64 or the equivalent. The hook 64 may be directly engaged with the hook 60 for checking out, testing or running up the airplane engines although it will usually be preferred to engage the hook 64 through a link 65 which in turn is engaged on to hook 60. For take off purposes the link 65 may be quite strong and after the airplane engines have been run up to maximum power or "take off power" the cylinder and piston mechanism 66 illustrated in Figure 12 is actuated to apply additional tension to break the link and thus allow immediate take off of the airplane. As an alternative the link 65 may be designed to fail or break when the engines of the airplane A exert a given or maximum thrust, it being apparent that other break away facilities may be employed if desired. The lower end of the cable 63 is secured to the hydraulic cylinder and piston mechanism 66 which in turn is anchored to the platform 10 or directly to the vessel V. The mechanism 66 is controlled by an appropriate valve 67 and is adapted to apply a positive downward or airplane anchoring force to the cable 63. A dynamometer 68 of selected or appropriate type is preferably interposed in the cable 63 and has either a direct or remote dial or other means for indicating the thrust developed by the propulsive engines of the airplane A.

The bockstop 14 and landing signal officers' platform or station 18 are elevated a substantial distance above the deck of the vessel V, as above described, and therefore constitute elevation reference points for the pilot when landing the airplane A. However, for certain operations and in the handling of given aircraft, it may be found desirable to provide extensions at the upper end of the backstop 14. Thus in Figure 4, posts 70 rise from the upper corners of the backstop 14 to constitute readily observed altitude reference markers for the pilot to assist him in landing the airplane A on the net 13. It should be observed that as the landing platform 10 is at the rear of the backstop 14 the funnels, booms, masts, and other projecting parts of the vessel V do not form hazards or interfere with the landing or taking off of the airplane A and do not obstruct the view of the pilot as the airplane is designed to take off vertically from the landing platform and in landing the airplane it is brought in or translated forwardly toward the landing net, with respect to the vessel V.

The particular airplane A illustrated has two counter rotating propellers 71 and is a one-place craft carrying only a pilot. It will be assumed that the pilot's seat 72 is arranged to pivot or rotate about an axis just below the pilot's elbow so that the pilot assumes a position such as shown in Figures 2 and 3 when the airplane is in the substantially vertical attitude. In this position the pilot may look sidewise out of his cockpit to see the backstop 14, the landing signal officer, etc. during the landing and take off procedures. It will also be assumed that the airplane A has ample power to make a transition from a level flight attitude to a vertical attitude and to translate itself sidewise in such a vertical attitude.

In employing the above described apparatus of the invention the airplane A may initially be in the vertical position illustrated in Figures 2 to 5 inclusive where its pads or fingers 45 rest on the tautly drawn net 13. The airplane is preferably anchored by the cable 63 and associated equipment as described above and before preparing for a take off the tip net 22 is retracted by operating the motor 29. With the airplane engines running the engines may be checked out and, if desired, run up to maximum thrust. When this has been done, the pilot signals the landing signal officer that all is in readiness and the latter at the proper time actuates the cylinder mechanism 66 to break the ring 65. Upon failure of the ring 65 the airplane rises vertically from the platform 10. The points 44 of the alighting gear are of course free to move upwardly out of the net 13 and the pads or fingers 45 do not in any way interfere with the vertical ascent of the airplane. Having cleared the net 13 and the vessel, the fingers 45 retracted and the airplane A may be handled and flown in the usual manner.

In making a landing, the airplane A may approach substantially perpendicular to the vessel V on the port side in a level flight attitude and make a transition to the vertical attitude at the stern of the vessel. The pilot sets his instruments to obtain the translation velocity necessary to hold against any cross wind that may be present. Flying substantially parallel to the vessel V the pilot decreases altitude and translates the airplane A sidewise toward the landing platform 10. Figure 1 illustrates three positions of the airplane A in approaching the landing platform 10, the first position being one of transition from the level to the vertical attitude, the third position being a vertical attitude above and at the stern of the vessel V, the arrow X illustrating the translating of the airplane forwardly and downwardly toward the net 13. The motors 52 are operated at this time or before to extend the fingers 45 of the alighting gear and the tip net 22 has been extended to its operative position. When the airplane A has assumed a position, such as illustrated in Figure 2, where it is slightly above and at the stern of the platform 10, the pilot is in a position to observe the landing signal officer and the latter assumes the flight direction responsibility. Under his direction the airplane is translated sidewise directly over the landing platform 10 at a sufficient altitude to clear all parts of the landing platform equipment. The pilot is then given the signal to close or move in, in a sidewise direction to bring the wing tip to or against the backstop 14 which relieves him of the responsibility for further accurate sidewise positioning of the airplane. The landing signal officer may then give the signal to reduce power so that the airplane drops or lowers onto the landing net 13 in the vertical position to land on the plurality of alighting gear assemblies, the points 44 entering the net 13 and the fingers 45 engaging on the net. At the same time the aft point 25 of the wing tip nacelle enters or penetrates the tip net 22 preventing the airplane from tipping even under severe conditions of pitch or roll of the vessel V. The shock absorbing cylinders and pistons 36 and 37 of the alighting gear and the somewhat yieldable net 13 effectively absorb the shock accompanying landing of the airplane on the net 13 and the airplane being anchored, by the plurality of alighting gear engaged in the net 13 and by the wing tip 25 engaged in the tip net 22, is dependably held and stabilized against tipping. Following the landing the airplane may be positively anchored by the cable 36 if this is deemed advisable.

Having described only typical forms of the invention we do not wish to be limited to the specific details herein set forth, but wish to reserve to ourselves any variations or modifications that may appear to those skilled in the art and fall within the scope of the following claims.

We claim:

1. Apparatus for facilitating the landing and taking off of aircraft having a wing and alighting gear at its aft end comprising a generally horizontal landing area for receiving said gear to support the aircraft, and a generally vertical backstop at one side of the area to be engaged or approached by the tip of the wing as the aircraft moves onto the area, the backstop including a supporting structure, vertically spaced substantially horizontal cables on said structure, and tubular rollers of yielding material rotatable on the cables, the cables and rollers constituting a yieldable shock absorbing assembly.

2. Apparatus for facilitating the vertical landing of an aircraft having alighting gear at its aft end and a rearwardly projecting wing tip point comprising a generally horizontal landing area for receiving said gear to support the aircraft, a generally vertical backstop at a side of the area to be engaged or approached by the tip of the wing as the aircraft moves onto the area, and a generally horizontal tip net at the backstop to receive said tip point to stabilize the aircraft when it lands on the area.

3. The apparatus of claim 2 in which the backstop comprises a plurality of horizontal rollers arranged in a vertical series.

4. The apparatus of claim 2 in which the tip net is movable between a retracted position and the generally horizontal position, and means for moving the tip net.

5. The apparatus of claim 2 in which the backstop is spaced above the plane of said net and the tip net is adjacent the lower edge of the backstop.

6. The apparatus of claim 2 wherein the backstop is spaced above the plane of the first mentioned area and is set back from the area and wherein the tip net projects from the lower portion of the backstop toward the area.

7. The apparatus of claim 2 wherein the backstop is spaced above the first mentioned area, and which includes means for retracting the tip net to a generally vertical position.

8. Apparatus for facilitating the landing and taking off a vertical rising aircraft having an empennage and a wing comprising a generally horizontal landing net, a plurality of points on the empennage for entering the landing net, a generally horizontal tip net spaced above the landing net, and a point on the wing for entering the tip net to stabilize the aircraft on the apparatus.

9. Apparatus for facilitating the landing and taking off a vertical rising aircraft having an aft portion and a wing comprising a generally horizontal landing net, a plurality of points on said aft portion for entering the landing net, fingers extending laterally from said points to engage the landing net to support the aircraft thereon, a generally horizontal tip net spaced above the landing net, and a point on the wing for entering the tip net to stabilize the aircraft on the apparatus.

10. Apparatus for facilitating the vertical landing of an aircraft having alighting gear at its aft end and a rearwardly projecting wing tip point comprising a generally horizontal landing net for receiving said gear to support the aircraft, and a generally horizontal tip net spaced above the landing net for receiving the wing tip point to stabilize the landed aircraft.

11. Apparatus for facilitating the landing and taking off a vertical rising aircraft having an empennage and a wing comprising a generally horizontal landing net, a plurality of points on the empennage for entering the landing net, a generally horizontal tip net spaced above the landing net, fingers movably connected with the fingers, means for moving the fingers from retracted positions to extended positions where they project laterally from the fingers to bear on the landing net to support the aircraft thereon, and a rearwardly projecting tip point on the wing for entering the tip net to stabilize the aircraft on the nets.

12. Apparatus for facilitating the landing and taking off of a vertical rising aircraft having a plurality of aft surfaces comprising a landing net, a shock absorbing unit on each surface, a point projecting aft from each unit and adapted to enter the net when the aircraft is landed on said net in a vertical attitude, and fingers projectable laterally from said points to engage on said net to support the aircraft thereon.

13. Apparatus for facilitating the landing and taking off of a vertical rising aircraft having a plurality of aft surfaces comprising a landing net, a shock absorbing unit on each surface, a point on each unit, fingers movably associated with each point, and means for projecting the points aft from their respective units and for simultaneously projecting the fingers laterally from their respective points to position the points to enter the net and to position the fingers to engage the net to support the aircraft thereon when the aircraft lands vertically on the net.

References Cited in the file of this patent

UNITED STATES PATENTS

| | | |
|---|---|---|
| 1,625,020 | Diago | Apr. 19, 1927 |
| 2,058,678 | Fry | Oct. 27, 1936 |
| 2,358,426 | Tompson | Sept. 19, 1944 |
| 2,387,762 | Leonard | Oct. 30, 1945 |
| 2,415,071 | Brie | Feb. 4, 1947 |
| 2,479,125 | Leonard | Aug. 16, 1949 |
| 2,712,420 | Amster | July 5, 1955 |